(12) United States Patent
Hsu et al.

(10) Patent No.: US 10,685,213 B2
(45) Date of Patent: Jun. 16, 2020

(54) SYSTEMS AND METHODS FOR TRACKING FACIAL FEATURES

(71) Applicant: Perfect Corp., New Taipei (TW)

(72) Inventors: KaiKai (Clay) Hsu, Taipei (TW); Chih-Yu (Detta) Cheng, Taipei (TW)

(73) Assignee: PERFECT CORP., New Taipei (TW)

( * ) Notice: Subject to any disclaimer, the term of this patent is extended or adjusted under 35 U.S.C. 154(b) by 107 days.

(21) Appl. No.: 16/112,857

(22) Filed: Aug. 27, 2018

(65) Prior Publication Data

US 2019/0073519 A1 Mar. 7, 2019

Related U.S. Application Data

(60) Provisional application No. 62/555,094, filed on Sep. 7, 2017.

(51) Int. Cl.
*G06K 9/00* (2006.01)
*G06T 7/73* (2017.01)
*G06T 7/246* (2017.01)
*G06K 9/62* (2006.01)

(52) U.S. Cl.
CPC ..... *G06K 9/00228* (2013.01); *G06K 9/00281* (2013.01); *G06K 9/00671* (2013.01); *G06T 7/246* (2017.01); *G06T 7/73* (2017.01); *G06K 9/6203* (2013.01); *G06T 2207/30201* (2013.01)

(58) Field of Classification Search
CPC .......... G06K 9/00228; G06K 9/00281; G06K 9/00671; G06K 9/6203; G06T 2207/30201; G06T 7/73; G01N 33/0006; G01N 33/0036
See application file for complete search history.

(56) References Cited

U.S. PATENT DOCUMENTS

2017/0208341 A1* 7/2017 Kulakov .............. H04N 19/533
2018/0033206 A1* 2/2018 Han .......................... G06T 7/74

OTHER PUBLICATIONS

Yue Wu and Qiang Ji, "Facial Landmark Detection: a Literature Survey" International Journal on Computer Vision. Nov. 2016.

* cited by examiner

*Primary Examiner* — Said M Elnoubi
(74) *Attorney, Agent, or Firm* — McClure, Qualey & Rodack, LLP (57) ABSTRACT

A computing device determines, in a first frame, a first location of a feature point and also determines in a second frame, a second location of the feature point. The computing device generates a motion vector for the feature point in the first frame and relocates the first location in the first frame to a first refined location based on the motion vector. The computing device generates a smoothed location of the feature point in the second frame based on the refined location and the second location of the feature point in the second frame.

23 Claims, 8 Drawing Sheets

SYSTEMS AND METHODS FOR TRACKING FACIAL FEATURES

CROSS-REFERENCE TO RELATED APPLICATION

This application claims priority to, and the benefit of, U.S. Provisional Patent Application entitled, "Method to improve facial landmark tracking," having Ser. No. 62/555,094, filed on Sep. 7, 2017, which is incorporated by reference in its entirety.

TECHNICAL FIELD

The present disclosure generally relates to augmented reality and more particularly, to systems and methods for tracking facial features.

BACKGROUND

With the proliferation of smartphones, tablets, and other display devices, people have the ability to view and edit digital content virtually any time where application programs have become popular on smartphones and other portable display devices for viewing media content. Augmented reality (AR) refers to technology that enhances a view of a physical world environment with virtual computer-generated effects, such as sound or graphics. Various techniques for tracking facial features in the context of AR are prone to error, thereby lowering the quality of the AR experience for users. Therefore, there is a need for an improved method for tracking features in AR platforms.

SUMMARY

In accordance with one embodiment, a computing device determines, in a first frame, a first location of a feature point and also determines in a second frame, a second location of the feature point. The computing device generates a motion vector for the feature point in the first frame and relocates the first location in the first frame to a first refined location based on the motion vector. The computing device generates a smoothed location of the feature point in the second frame based on the refined location and the second location of the feature point in the second frame.

Another embodiment is a system that comprises a memory storing instructions and a processor coupled to the memory. The processor is configured by the instructions to determine, in a first frame, a first location of a feature point and also determine in a second frame, a second location of the feature point. The processor is further configured to generate a motion vector for the feature point in the first frame and relocate the first location in the first frame to a first refined location based on the motion vector. The processor is further configured to generate a smoothed location of the feature point in the second frame based on the refined location and the second location of the feature point in the second frame.

Another embodiment is a non-transitory computer-readable storage medium storing instructions to be implemented by a computing device having a processor, wherein the instructions, when executed by the processor, cause the computing device to determine, in a first frame, a first location of a feature point and also determine in a second frame, a second location of the feature point. The processor is further configured to generate a motion vector for the feature point in the first frame and relocate the first location in the first frame to a first refined location based on the motion vector. The processor is further configured to generate a smoothed location of the feature point in the second frame based on the refined location and the second location of the feature point in the second frame.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Various aspects of the disclosure can be better understood with reference to the following drawings. The components in the drawings are not necessarily to scale, with emphasis instead being placed upon clearly illustrating the principles of the present disclosure. Moreover, in the drawings, like reference numerals designate corresponding parts throughout the several views.

DETAILED DESCRIPTION

Figure 1:
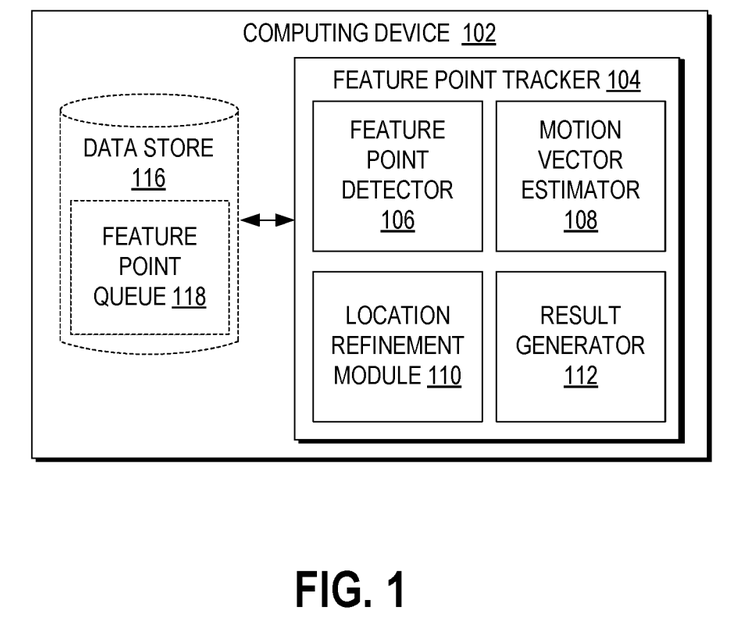
FIG. 1 is a block diagram of a computing device for tracking facial features in accordance with various embodiments of the present disclosure.

Various embodiments are disclosed for providing an improved facial feature technique for accurately tracking facial features. Accurate determination of feature point displacement is important to providing an improved augmented reality (AR) experience for the user. A description of a system for tracking facial features is now described followed by a discussion of the operation of the components within the system. FIG. 1 is a block diagram of a computing device 102 in which the improved feature point tracking technique disclosed herein may be implemented. The computing device 102 may be embodied as a computing device such as, but not limited to, a smartphone, a tablet computing device, a laptop, and so on.

A feature point tracker 104 executes on a processor of the computing device 102 and includes a feature point detector 106, a motion vector estimator 108, a refinement module

110, and a result generator 112. The feature point detector 106 is configured to obtain frames in a video and determine a location of a feature point in each frame. For some embodiments, the feature point corresponds to a predetermined landmark facial feature. The motion vector estimator 108 is configured to generate a motion vector for the feature point in the first frame based on the location of the feature point in the second frame. The refinement module 110 relocates the feature point to a refined location in the first frame based on the motion vector. The result generator 112 generates a smoothed location of the feature point in the second frame based on the refined location of the relocated feature point and the location of the feature point in the second frame. The operations above are reiterated for each ensuing frame in the video.

For some embodiments, the first and second locations are determined utilizing a facial landmark detection method, which is utilized to identify the locations of key landmark points on the facial regions depicted in digital images or videos. Such key landmark points may comprise dominant points describing the unique location of facial components (e.g., eye corner) or an interpolated point connecting those dominant points around the facial components and facial contour. For some embodiments, the facial landmark detection method comprises a cascaded regression based landmark detection method. Such regression-based methods directly learn the mapping from image appearance to the landmark locations. They usually do not explicitly build any global face shape model. Instead, the face shape constraints may be implicitly embedded. In general, the regression-based methods can be classified into direct regression methods, cascaded regression methods, and deep-learning based regression method. Cascaded regression methods start from an initial guess of the facial landmark locations and gradually update the landmark locations across stages with different regression functions learned for different stages. During the training phase, in each stage, regression models are applied to learn the mapping between shape indexed image appearances to the shape updates. During the testing phase, the learned regression models are sequentially applied to update the shapes across iterations.

As one of ordinary skill will appreciate, the video processed by the feature point tracker 104 may be encoded in any of a number of formats including, but not limited to Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), 360 degree video, 3D scan model, or any number of other digital formats.

Figure 2:
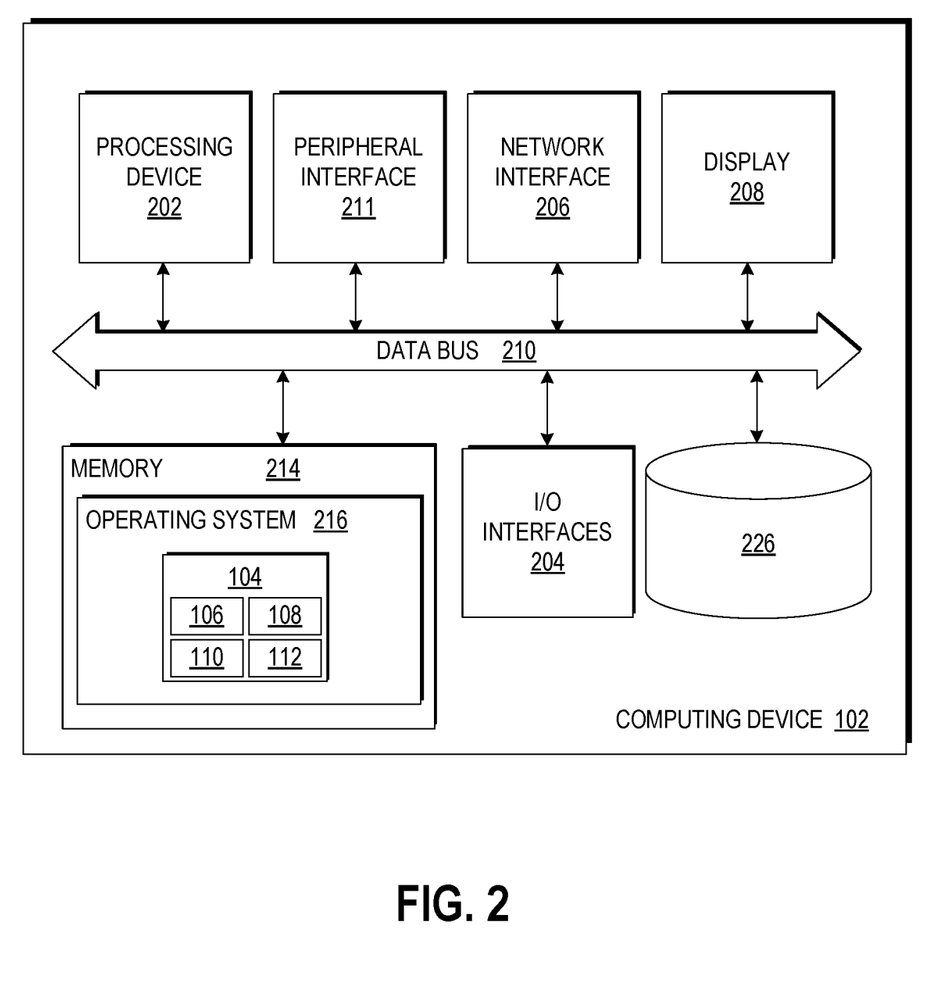
FIG. 2 is a schematic diagram of the computing device of FIG. 1 in accordance with various embodiments of the present disclosure.

FIG. 2 illustrates a schematic block diagram of the computing device 102 in FIG. 1. The computing device 102 may be embodied in any one of a wide variety of wired and/or wireless computing devices, such as a desktop computer, portable computer, dedicated server computer, multi-processor computing device, smart phone, tablet, and so forth. As shown in FIG. 2, the computing device 102 comprises memory 214, a processing device 202, a number of input/output interfaces 204, a network interface 206, a display 208, a peripheral interface 211, and mass storage 226, wherein each of these components are connected across a local data bus 210.

The processing device 202 may include any custom made or commercially available processor, a central processing unit (CPU) or an auxiliary processor among several processors associated with the computing device 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 may include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software which may comprise some or all the components of the computing device 102 depicted in FIG. 1. In accordance with such embodiments, the components are stored in memory 214 and executed by the processing device 202, thereby causing the processing device 202 to perform the operations/functions for implementing the pin mechanism features disclosed herein. One of ordinary skill in the art will appreciate that the memory 214 can, and typically will, comprise other components which have been omitted for purposes of brevity. For some embodiments, the components in the computing device 102 may be implemented by hardware and/or software.

Input/output interfaces 204 provide any number of interfaces for the input and output of data. For example, where the computing device 102 comprises a personal computer, these components may interface with one or more user input/output interfaces 204, which may comprise a keyboard or a mouse, as shown in FIG. 2. The display 208 may comprise a computer monitor, a plasma screen for a PC, a liquid crystal display (LCD) on a hand held device, a touchscreen, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

Figure 3:
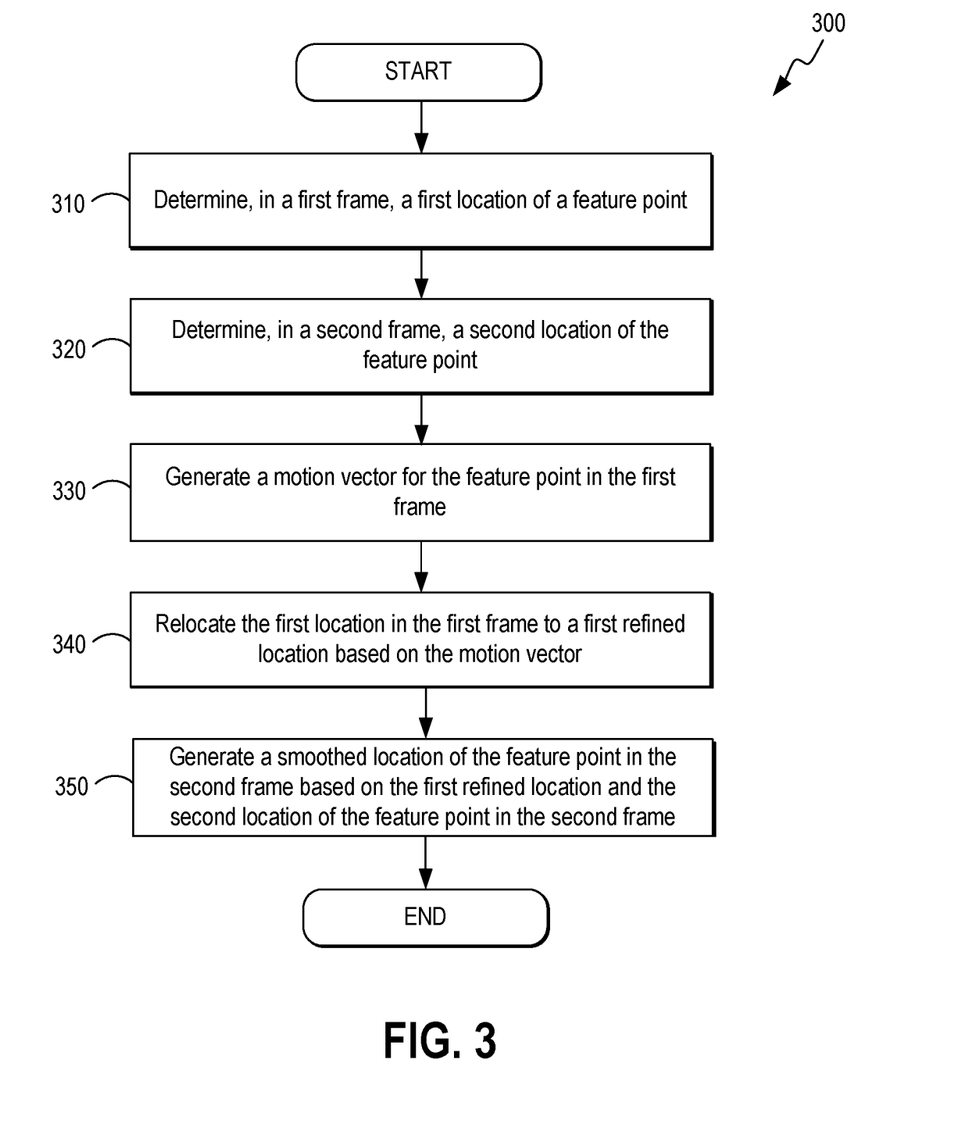
FIG. 3 is a top-level flowchart illustrating examples of functionality implemented as portions of the computing device of FIG. 1 for tracking facial features according to various embodiments of the present disclosure.

Reference is made to FIG. 3, which is a flowchart 300 in accordance with various embodiments for implementing an improved feature point tracking technique performed by the computing device 102 of FIG. 1. It is understood that the flowchart 300 of FIG. 3 provides merely an example of the different types of functional arrangements that may be employed to implement the operation of the various components of the computing device 102. As an alternative, the flowchart 300 of FIG. 3 may be viewed as depicting an example of steps of a method implemented in the computing device 102 according to one or more embodiments.

Although the flowchart 300 of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. It is understood that all such variations are within the scope of the present disclosure.

At block 310, the computing device 102 determines, in a first frame, a first location of a feature point. For some embodiments, the feature point corresponds to a predetermined landmark facial feature, and the first and second locations are determined utilizing a facial landmark detection method. The facial landmark detection method comprises a regression based landmark detection method.

At block 320, the computing device 102 determines, in a second frame, a second location of the feature point. At block 330, the computing device 102 generates a motion vector for the feature point in the first frame. For some embodiments, the motion vector is generated for the feature point in the first frame based on both the first location in the first frame and the second location in the second frame. For some embodiments, the motion vector is generated for the feature point in the first frame based on one of: pixels surrounding the first location in the first frame and pixels in the second frame; or pixels surrounding the second location in the second frame and pixels in the first frame.

At block 340, the computing device 102 relocates the first location in the first frame to a first refined location based on the motion vector. At block 350, the computing device 102 generates a smoothed location of the feature point in the second frame based on the first refined location and the second location of the feature point in the second frame. For some embodiments, the smoothed location of the feature point is generated in the second frame based on a weighted combination of the first refined location in the first frame and the second location of the feature point in the second frame.

For some embodiments, the computing device 102 further determines, in a third frame, a third location of the feature point and generates a second motion vector for the feature point in the second frame. The computing device 102 relocates the second location to a second refined location based on the second motion vector and relocates, the first refined location to a further-refined location based on the second motion vector. For some embodiments, the computing device 102 generates a smoothed location in the third frame based on each of the further-refined location, the second refined location, and the third location. For other embodiments, the computing device 102, generates the smoothed location in the third frame based on a weighted combination of each of the further-refined location, the second refined location, and the third location. Thereafter, the process in FIG. 3 ends.

Figure 4:
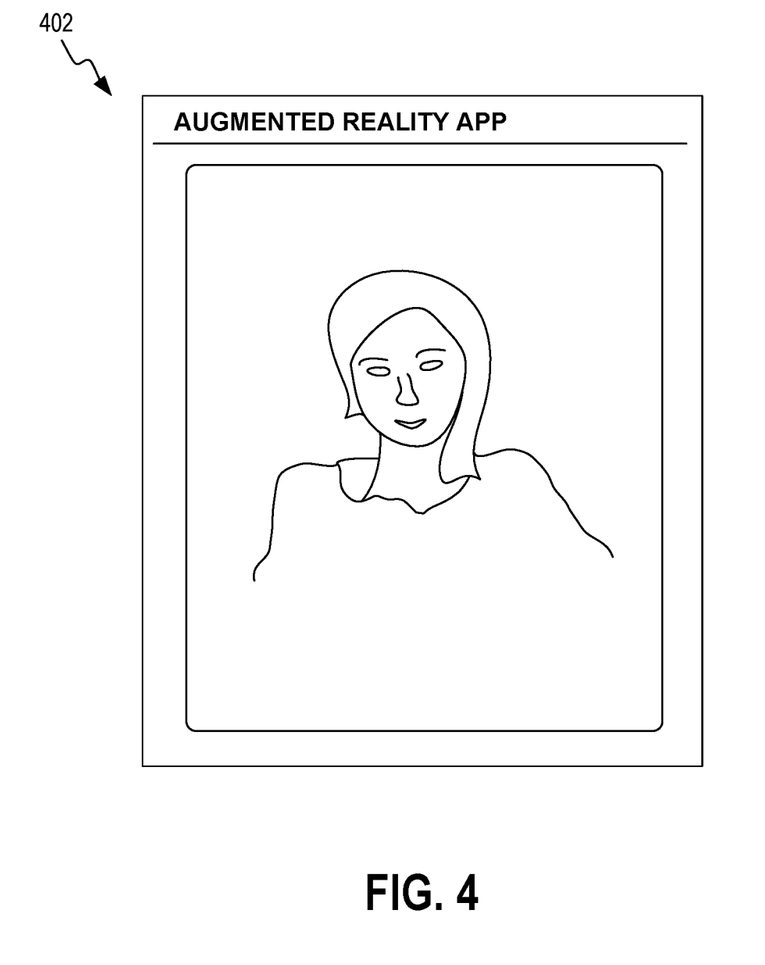
FIG. 4 illustrates an example user interface provided on a display of the computing device in FIG. 1 whereby a digital image of a user is shown in the user interface according to various embodiments of the present disclosure.
Figure 5:
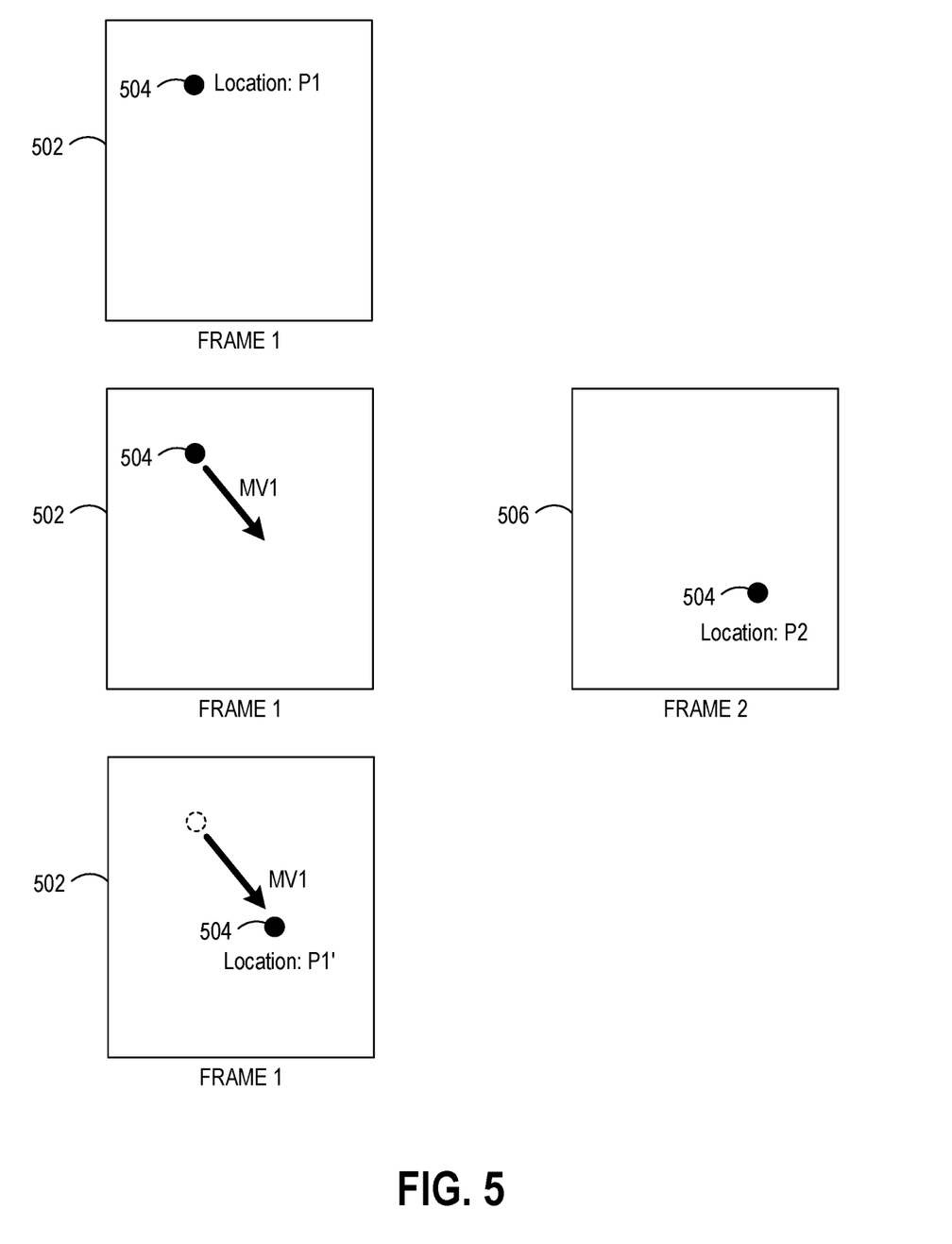
FIG. 5 illustrates a feature point being tracked across various frames according to various embodiments of the present disclosure.

Having described the basic framework of a system for implementing an improved feature point tracking technique, reference is made to the following figures, which illustrate various features according to various embodiments. FIG. 4 illustrates an example user interface 402 provided on a display of the computing device 102 whereby a digital image of a user is shown in the user interface 402. Tracking of facial features (e.g., the eyes) is needed for such purposes as virtual application of makeup effects (e.g., eyeliner effect). FIG. 5 illustrates a feature point 504 being tracked across various frames. In a first frame 502, the location P1 of the feature point 504 is estimated. Next, the location P2 of the feature point 504 is determined in the second frame 506. Based on the location P2 in the second frame 506, a motion vector MV1 for the feature point 504 in the first frame 502 is generated. As shown, the location P1 in the first frame 502 is then relocated to a refined location P1' based on the generated motion vector MV1 to generate a relocated feature point at a refined location in the first frame. For some embodiments, the location P1 in the first frame 502 is relocated to a refined location P1' based on the generated motion vector MV1 according to the following:

Refined location $(P1')=(P1+MV1)$.

Note that in the expression above, the direction of the motion vector MV1 is defined relative to transition from the first frame 502 to the second frame 506.

Figure 6:
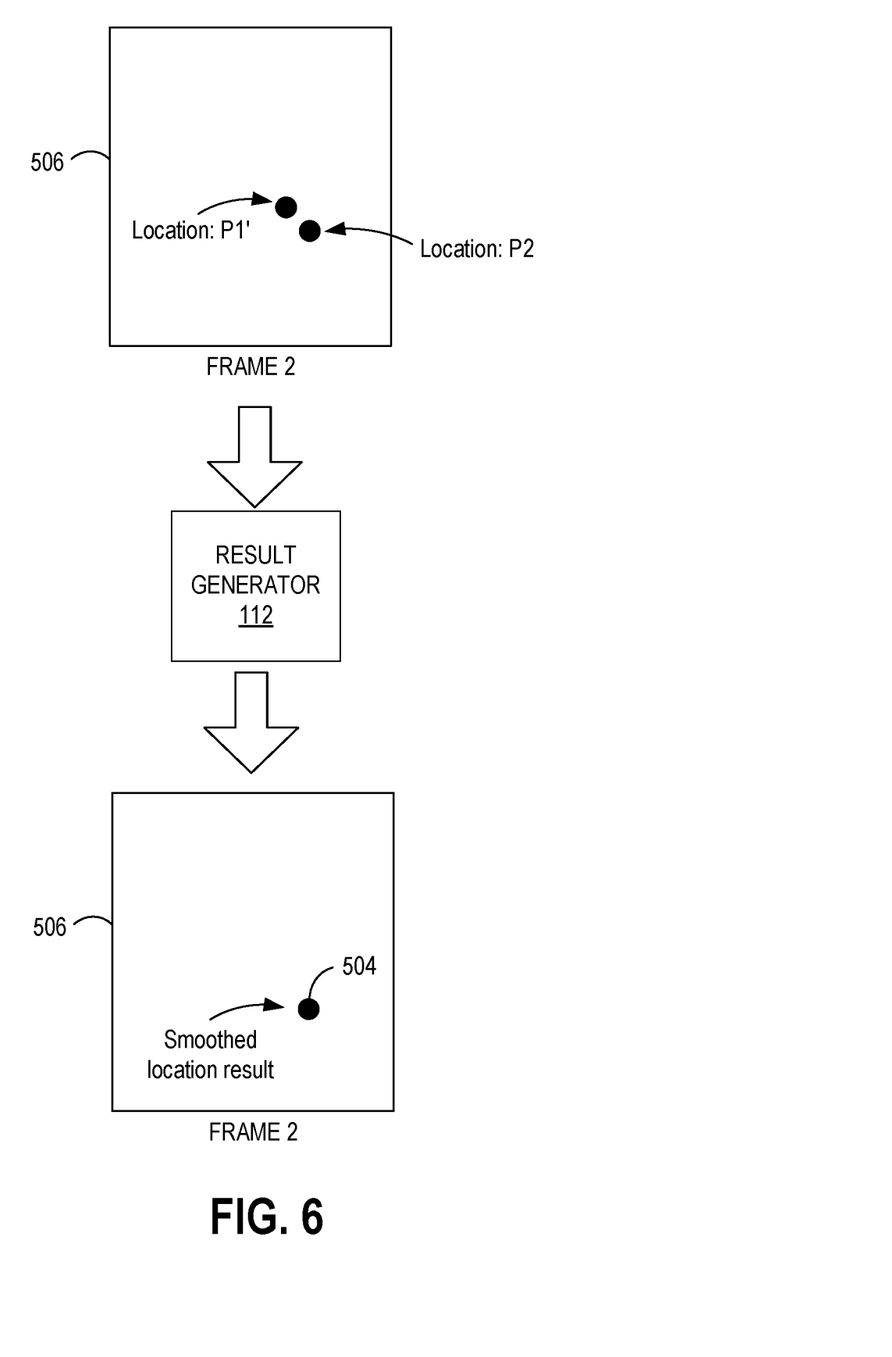
FIG. 6 illustrates generation of a smoothed location result in the second frame according to various embodiments of the present disclosure.

Reference is made to FIG. 6, which illustrates generation of a smoothed location result in the second frame. In the second frame 506, the refined location P1' derived in connection with the first frame 502 and the estimated location P2 in the second frame 506 of the feature point 504 are input to the result generator 112 of the feature point tracker 104 (FIG. 1). The result generator 112 generates a smoothed location of the feature point 504 in the second frame 506 based on both the refined location P1' of the relocated feature point 504 and the location P2 of the feature point 504 in the second frame 506. Specifically, the result generator 112 generates the smoothed location (S2) according to the following:

$S2=(w2*P2)+(w1*P1')$, where $w1+w2=1$.

For some embodiments, the smoothed location in the second frame is generated based on a weighted combination of the refined location P1' of the relocated feature point 504 and the location P2 of the feature point 504 in the second frame 506.

Figure 7:
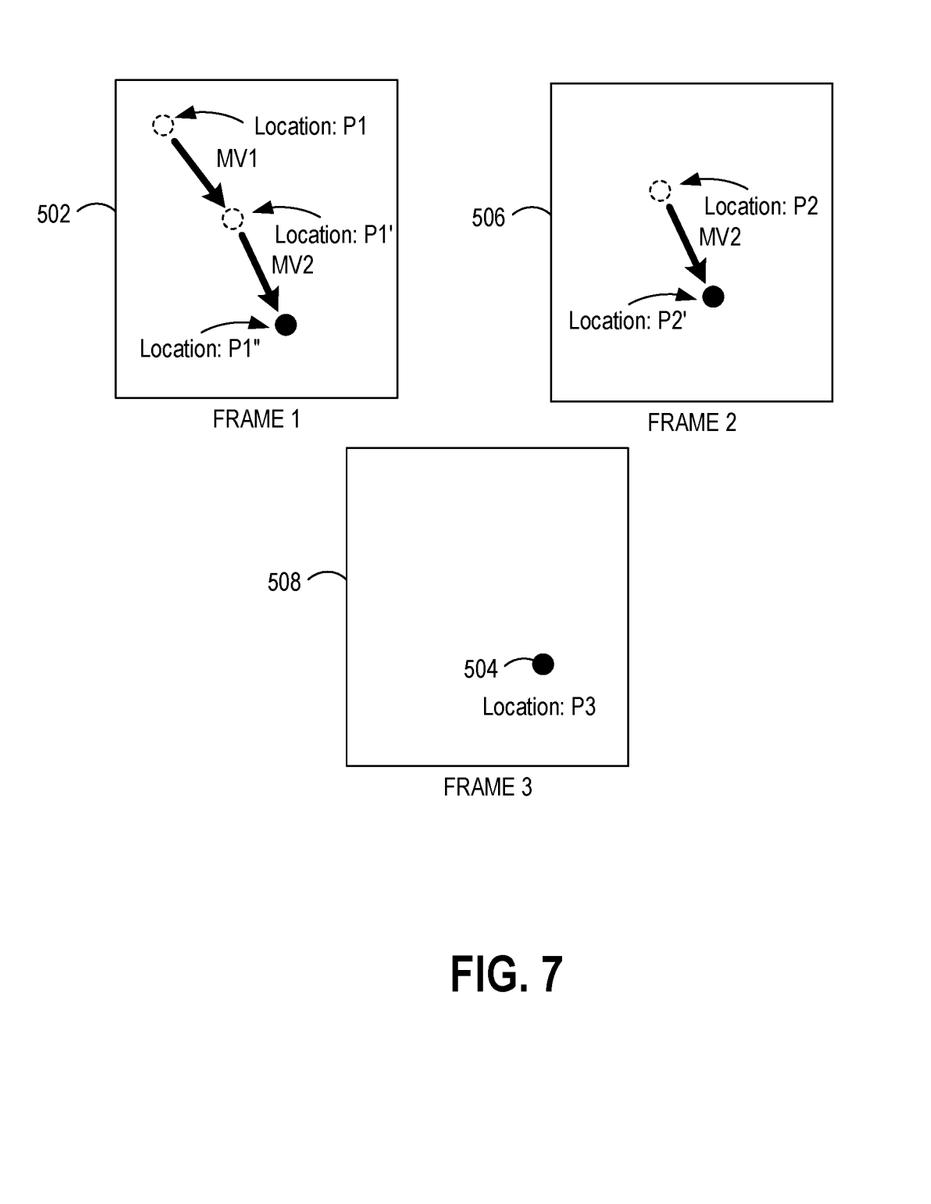
FIG. 7 illustrates processing of a third frame according to various embodiments of the present disclosure.

These steps are repeated for each ensuing frame. Reference is made to FIG. 7, which illustrates the generation of a smoothed location for a next frame in the video. In a third frame 508, a location P3 of the feature point 504 is determined, and a second motion vector MV2 is generated for the feature point 504 in the second frame 506 based on the location P3 of the feature point 504 in the third frame 508. The feature point 504 is relocated to a refined location P2' in the second frame 506 based on the second motion vector MV2. In the first frame 502, the relocated feature point 504 at location P1' is further relocated to a second refined location P1" based on the second motion vector MV2 to generate a relocated feature point at a refined location in the first frame. For some embodiments, the relocated feature point 504 at location P1' is relocated to a second refined location P1" based on the second motion vector MV2 and the relocated feature point at P2 is relocated to a refined location P2' based on the following:

Refined location $(P1")=(P1+MV1+MV2)$;

Refined location $(P2')=(P2+MV2)$.

Note that in the expression above, the direction of the first motion vector MV1 is defined relative to transition from the first frame 502 to the second frame 506 and the direction of the second motion vector MV2 is defined relative to transition from the second frame 506 to the third frame 508.

Figure 8:
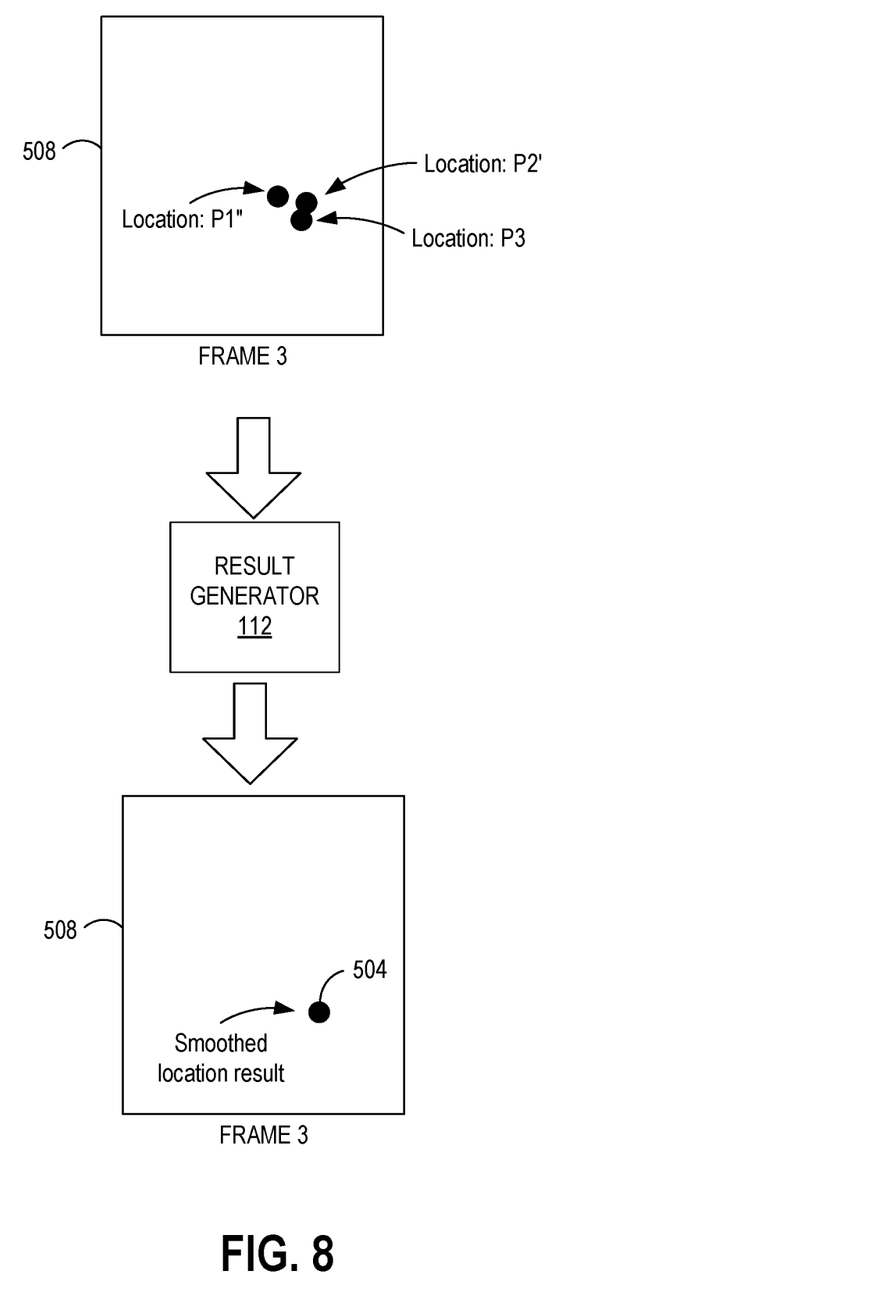
FIG. 8 illustrates the generation of a smoothed location for the third frame in the video according to various embodiments of the present disclosure.

With reference to FIG. 8, a smoothed location is generated in the third frame 508. Specifically, the result generator 112 generates a smoothed location of the feature point 504 in the third frame 508 based on each of: the refined location P1" of the relocated feature point 504 in the first frame 502, the refined location P2' of the feature point 504 in the second frame 506, and the location P3 of the feature point 504 in the third frame 508. Specifically, the result generator 112 generates the smoothed location (S3) according to the following:

$$S3=(w3*P3)+(w2*(P2+MV2))+(w1*(P1+MV1+MV2)),$$

where w1+w2+w3=1.

For some embodiments, the smoothed location in the third frame is generated based on a weighted combination of each of: the refined location P1" of the relocated feature point 504 in the first frame 502, the refined location P2' of the feature point 504 in the second frame 506, and the location P3 of the feature point 504 in the third frame 508.

For some embodiments, a confidence level is derived for each motion vector where the confidence level may be determined using a block-matching algorithm. A block matching algorithm involves dividing the current frame of a video into macroblocks and comparing each of the macroblocks with a corresponding block between the first frame and second frame. The pixel value between the macroblock is compared with the pixel value of a corresponding block. The difference in pixels values determines the weight value (e.g., w1, w2, w3). Specifically, a lower weight value is assigned when the pixel value difference is greater, whereas a higher weight value is assigned when the pixel values are similar (i.e., the pixel value difference is small).

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A method implemented in a computing device, comprising:
    determining, in a first frame, a first location of a feature point;
    determining, in a second frame, a second location of the feature point;
    generating a motion vector for the feature point in the first frame;
    relocating the first location in the first frame to a first refined location based on the motion vector; and
    generating a smoothed location of the feature point in the second frame based on the first refined location and the second location of the feature point in the second frame.

2. The method of claim 1, wherein the motion vector is generated for the feature point in the first frame based on both the first location in the first frame and the second location in the second frame.

3. The method of claim 1, wherein the motion vector is generated for the feature point in the first frame based on one of: pixels surrounding the first location in the first frame and pixels in the second frame; or pixels surrounding the second location in the second frame and pixels in the first frame.

4. The method of claim 1, wherein the feature point corresponds to a predetermined landmark facial feature, and wherein the first and second locations are determined utilizing a facial landmark detection method.

5. The method of claim 4, wherein the facial landmark detection method comprises a regression based landmark detection method.

6. The method of claim 1, wherein generating the smoothed location of the feature point in the second frame is based on a weighted combination of the first refined location and the second location of the feature point in the second frame.

7. The method of claim 1, further comprising:
    determining, in a third frame, a third location of the feature point;
    generating a second motion vector for the feature point in the second frame;
    relocating the second location to a second refined location based on the second motion vector; and
    relocating the first refined location to a further-refined location based on the second motion vector.

8. The method of claim 7, further comprising generating a smoothed location in the third frame based on each of: the further-refined location; the second refined location; and the third location.

9. The method of claim 8, wherein generating the smoothed location in the third frame is based on a weighted combination of each of: the further-refined location; the second refined location; and the third location.

10. A system, comprising:
    a memory storing instructions;
    a processor coupled to the memory and configured by the instructions to at least:
        determine, in a first frame, a first location of a feature point;
        determine, in a second frame, a second location of the feature point;
        generate a motion vector for the feature point in the first frame;
        relocate the first location in the first frame to a first refined location based on the motion vector; and
        generate a smoothed location of the feature point in the second frame based on the first refined location and the second location of the feature point in the second frame.

11. The system of claim 10, wherein the motion vector is generated for the feature point in the first frame based on both the first location in the first frame and the second location in the second frame.

12. The system of claim 10, wherein the motion vector is generated for the feature point in the first frame based on one of: pixels surrounding the first location in the first frame and pixels in the second frame; or pixels surrounding the second location in the second frame and pixels in the first frame.

13. The system of claim 10, wherein the feature point corresponds to a predetermined landmark facial feature, and wherein the first and second locations are determined utilizing a facial landmark detection method.

14. The system of claim 13, wherein the facial landmark detection method comprises a regression based landmark detection method.

15. The system of claim 10, wherein the processor generates the smoothed location of the feature point in the second frame based on a weighted combination of the first refined location and the second location of the feature point in the second frame.

16. The system of claim 10, wherein the processor is further configured to:
    determine, in a third frame, a third location of the feature point;
    generate a second motion vector for the feature point in the second frame;
    relocate the second location to a second refined location based on the second motion vector; and relocate the first refined location to a further-refined location based on the second motion vector.

17. The system of claim 16, wherein the processor is further configured to generate a smoothed location in the third frame based on each of: the further-refined location; the second refined location; and the third location.

18. The system of claim 17, wherein the processor generates the smoothed location in the third frame based on a weighted combination of each of: the further-refined location; the second refined location; and the third location.

19. A non-transitory computer-readable storage medium storing instructions to be implemented by a computing device having a processor, wherein the instructions, when executed by the processor, cause the computing device to at least:
    determine, in a first frame, a first location of a feature point;
    determine, in a second frame, a second location of the feature point;
    generate a motion vector for the feature point in the first frame;
    relocate the first location in the first frame to a first refined location based on the motion vector; and
    generate a smoothed location of the feature point in the second frame based on the first refined location and the second location of the feature point in the second frame.

20. The non-transitory computer-readable storage medium of claim 19, wherein the motion vector is generated for the feature point in the first frame based on both the first location in the first frame and the second location in the second frame.

21. The non-transitory computer-readable storage medium of claim 19, wherein the processor is further configured to:
    determine, in a third frame, a third location of the feature point;
    generate a second motion vector for the feature point in the second frame based on a location of the feature point in the third frame;
    relocate the second location to a second refined location based on the second motion vector; and
    relocate the first refined location to a further-refined location based on the second motion vector.

22. The non-transitory computer-readable storage medium of claim 21, wherein the processor is further configured to generate a smoothed location in the third frame based on each of: the further-refined location; the second refined location; and the third location.

23. The non-transitory computer-readable storage medium of claim 22, wherein the processor generates the smoothed location in the third frame based on a weighted combination of each of: the further-refined location; the second refined location; and the third location.

* * * * *